United States Patent Office 2,996,460
Patented Aug. 15, 1961

2,996,460
COMPOSITIONS CONTAINING ALUMINA AND METHOD FOR THE PREPARATION THEREOF
David G. Braithwaite, Chicago, Ill., assignor to Nalco Chemical Company, a corporation of Delaware
No Drawing. Filed Feb. 20, 1957, Ser. No. 641,255
23 Claims. (Cl. 252—455)

This invention relates to alumina compositions and to a method for the preparation thereof.

One of the objects of the invention is to provide alumina compositions which are characterized by greater fluid density than ordinary alumina compositions.

Another object of the invention is to produce alumina-silica compositions having a higher fluid density than has heretofore been obtained in alumina-silica compositions.

An additional object of the invention is to produce alumina, with or without other oxides, in a very dense, compact, solid form.

Another object of the invention is to produce alumina, with or without other oxides, in the form of very dense microspheres.

Still a further object of the invention is to provide an improved method for producing alumina, with or without other oxides in a very dense form. Other objects will appear hereinafter.

In accomplishing these objects in accordance with this invention it has been found that when alumina is prepared in the presence of an aldonate, preferably a gluconate, with or without the addition of compounds capable of forming other metal oxides, the resultant composition has a very high fluid density which is much greater than that obtained when the aldonate is not present.

The invention will be further illustrated but is not limited by the following examples.

Example I

To 200 gallons of Chicago tap water containing 5 gallons of sodium aluminate liquor having the following composition:

| | Percent |
|---|---|
| Excess NaOH | 2.1 |
| Na$_2$CO$_3$ | 1.4 |
| Na$_2$Al$_2$O$_4$ | 71.0 |
| Gluconic acid | [1]1.84 |

[1] Based on the weight of the Na$_2$Al$_2$O$_4$.

at 140° F. there was added a solution of 12 gallons of 25% aluminum sulfate diluted to 100 gallons with Chicago tap water adjusted to 140° F. These solutions were mixed in approximately 5 minutes and the resultant pH of the batch was about 10.4 and the temperature about 141° F. The resultant slurry was filtered on a string discharge filter and the filter cake reslurried and spray dried in a Bowen spray drier. The final product had a fluid density of 42 pounds per cubic foot, an apparent bulk density of .83 and a surface area of 278 square meters per gram.

Example II

The procedure was the same as that described in Example I except that the preparation was conducted at 80° F. instead of 140° F. The resultant product had substantially the same physical characteristics.

Example III

To 193 gallons of an aqueous sodium silicate solution containing 42% sodium aluminate, 3–4% excess caustic soda, and 1.67% gluconic acid based on the weight of the sodium aluminate, and 3 gallons of sodium silicate containing 28.8% SiO$_2$ and 9.1% Na$_2$O diluted with 2300 gallons of water there was added 325 gallons of 25% aluminum sulfate solution diluted with 4 volumes of Chicago tap water prior to addition to the batch. The temperature of the preparation was about 80° F. and the final pH was 9.5. The resultant slurry was heated to 120° F. and filtered. The filter cake was reslurried and spray dried in a Bowen spray drier. The resultant product consisted of microspheres having an apparent bulk density of .78 and a fluid density of 37.5 pounds per cubic foot.

Example IV

To 134 gallons of an aqueous solution containing sodium aluminate, excess caustic soda and gluconic acid in the proportions described in Example I and 3 gallons of aqueous sodium silicate solution containing 28.8% SiO$_2$ and 9.1% Na$_2$O diluted with 2300 gallons of water there was added 260 gallons of 25% aluminum sulfate solution diluted with 4 volumes of water prior to addition to the batch. The temperature of the batch was maintained at 80° F. and the final pH was 9.5. The slurry was heated to 120° F., filtered and the filter cake reslurried and spray dried. Two separate batches were made and the spray drying was carried out with two different types of spray driers. The apparent bulk density of the resultant microspheres was approximately .77 and the fluid density was approximately 41 pounds per cubic foot. The surface area was approximately 278 square meters per gram. The type of spray drier used apparently had no substantial effect upon the physical characteristics of the resultant product. In one case a Bowen spray drier was used and in the other a Swenson spray drier was employed.

Example V

To 200 gallons of Chicago tap water at 80° F. there was added one quart of an aqueous solution of sodium silicate containing 28.8% SiO$_2$ and 9.1% Na$_2$O, 6 gallons of an aqueous solution of sodium aluminate containing approximately 42% sodium aluminate, 3–4% excess caustic soda and 1.67% gluconic acid (calculated on the weight of the sodium aluminate), together with .325 pound of additional gluconic acid added in the form of a 50% aqueous solution. To this solution an alum solution was added that was prepared by diluting 12½ gallons of 25% aluminum sulfate in water to 100 gallons with tap water. It required 55 gallons of the alum solution to adjust the pH of the batch to 9.35. The product was filtered and the filter cake reslurried and spray dried. The fluid density of the resultant spray dried microspheres was 45 pounds per cubic foot.

Example VI

To 2700 gallons of water there was added 725 pounds of an aqueous sodium aluminate liquor having a composition corresponding to that of the sodium aluminate solution described in Example I (containing 1.84% of gluconic acid based on the weight of the sodium aluminate) and 3 gallons of aqueous sodium silicate solution containing 28.8% SiO$_2$ and 9.1% Na$_2$O. To this solution was added 99 gallons of 25% aluminum sulfate solution diluted with approximately 5 volumes of water. The temperature of the preparation was 40° F., the pH after the addition of the aluminum sulfate was approximately 9.5. The batch was heated to 120° F. and filtered on a string discharge filter. The filter cake was reslurried and spray dried. The resultant alumina-silica composition had an apparent bulk density of .85 and a fluid density of 42.5.

Example VII

To 5900 gallons of water at 100° F. there are added 4 gallons (42 pounds) of 50% gluconic acid, 6 gallons (69½ pounds) of sodium silicate containing 28.8% SiO$_2$ and 9.2% Na$_2$O, and 252 gallons of sodium aluminate containing 38% $Na_2Al_2O_4$. The resultant mixture is heated to 110° F.

Over a period of 15 to 20 minutes, there are added to the heated mixture 144 gallons of 35% sulfuric acid, the acid being diluted with 45 gallons per minute of water (heated to 110° F.) during the addition.

Next, there is added to the heated mixture, over a period of 15 to 20 minutes, 185 gallons of 25% aluminum sulfate solution, the aluminum sulfate likewise being diluted by adding 45 gallons per minute of 110° F. water.

The pH is adjusted to 9.2–9.5 by adding the diluted aluminum sulfate described above. The resultant slurry is heated to 120° F. and filtered on a string discharge filter. The filter cake is reslurried to a pumpable mixture and spray dried to produce alumina containing a minor proportion of silica in the form of glass-like microspheres containing about 25% by weight total volatile content.

The resultant alumina-silica microspheres are treated in conventional ways to remove alkali metal ions and sulfate ions. The material is then passed into a flash drier to remove excess moisture until the total volatile content is about 20% by weight.

The microspherical particles are then impregnated with a solution of ammonium molybdate containing about 14.5% $MoO_3$. The quantity of this solution which is used should be enough to cause the alumina-silica microspheres to pick up around 10 to 11% $MoO_3$, on the dried weight of the final catalyst. Ordinarily, about 1 gram of said microspheres will pick up 0.6 cc. of such solution and this proportion produces the desired product which has the appearance of damp sand. This material is flash dried and activated by calcining at a temperature of around 1350° F. to 1400° F. The resultant catalyst containing $MoO_3$ is especially suitable for hydroforming operations in the treatment of petroleum hydrocarbons.

In a typical hydroforming process involving the use of this catalyst a naphtha feed stock with an API gravity of 55.0 and an aniline point of 126° F. is conducted over the catalyst at a space velocity of 0.7 employing ½ hour pretreatment with hydrogen, a 4 hour cycle and a ½ hour final purge with hydrogen. The temperature of the reactor is maintained at 900° F.

When this catalyst was tested in comparison with a commercially available catalyst containing $MoO_3$ which had been activated at a temperature of 1400° F. prior to the test, the activity rating and product distribution obtained with the catalyst of the present invention were superior to those of the commercial catalyst, the $MoO_3$ content of both catalysts being the same.

When alumina or mixtures of alumina and silica were prepared under comparable conditions without the addition of the gluconic acid the resultant spray dried microspheres had an apparent bulk density of about .64 to .65 and a fluid density of about 32 to 33 pounds per cubic foot. Thus, it is apparent that the addition of the gluconic acid produced a very substantial increase in the apparent bulk density and in the fluid density of the resultant product. In Example III where the amount of gluconic acid added was about 1.98% by weight of the total $Al_2O_3$ the fluid density was approximately 15% higher than the fluid density without the addition of the gluconic acid. In Examples I, II, IV and VI 2.2% by weight of gluconic acid, based on the $Al_2O_3$, was employed, the fluid density was approximately 25% higher than the fluid density without the gluconic acid. In Example V where the quantity of gluconic acid added was approximately 2.95%, based on total $Al_2O_3$, the fluid density was approximately 40% higher than that of the same product made without the addition of gluconic acid.

The aldonic acid employed in the practice of the invention can be obtained by the oxidation of an aldose or in any other suitable manner. If gluconic acid is used as such, it is preferably employed in the form of an aqueous solution having a concentration of about 50% of gluconic acid. Other examples of acids and salts thereof which may be used are galactonic, arabonic, xylonic and mannonic. The aldonic acids exist in several forms and the invention contemplates the use of one or more of these forms or mixtures thereof, including the lactone forms, for example, the gamma lactone form of gluconic acid. Commercial gluconic acid is available as a 50% aqueous solution containing approximately 99% gluconic acid and 1% glucose.

Since the aldonic acid is added to an alkaline solution in the procedures used in the examples, it will be apparent that it actually exists in solution in the form of a salt, e.g., sodium gluconate. Instead of employing the free aldonic acid in the preparation of the alumina compositions, salts thereof can be used, preferably the sodium salts. It will be understood, however, that the invention is not limited with respect to the type of aldonate employed. Other examples of suitable aldonates are the potassium, zinc, magnesium, calcium and lithium salts of gluconic acid or other aldonic acids. If the alumina is prepared under acid conditions, the free aldonic acid would normally be used rather than a salt thereof. If an aldonate is used it should be soluble in the reaction medium in the proportions in which it is used. In the preferred process the aldonates are soluble in the aqueous alkaline solutions in the proportions in which they are employed at a pH within the range of 9 to 10.5.

The amount of the aldonic acid or aldonate which should be employed is that amount which will produce an appreciable increase in the fluid density of the resultant alumina. The maximum amount is that amount beyond which further additions do not produce a substantial increase in the fluid density of the alumina. The preferred proportions of aldonic acid or aldonate are within the range of about .5% to 6.0%, calculated as gluconic acid, on the weight of $Al_2O_3$ content, and excellent results have been obtained with proportions in the range of about 2% to 3% of the aldonate, calculated as gluconic acid on the weight of $Al_2O_3$.

As shown by Example VII mineral acids, such as sulfuric acid, can be used in precipitating the alumina in the presence of the aldonic acid. Acidic salts, such as alumina chloride, can also be used. Where it is desired to form an alumina-silica composition it is usually preferable to precipitate the silica from an alkali soluble silicate but another silica-forming compound such as a silica tetrahalide (e.g., silicon tetrachloride) can also be used as the source of silica. If a silicon tetrahalide is the source of the silica it is preferably added to the acidic reagent and hydrolyzed during the preparation of the batch.

In my copending application Serial No. 546,007, filed November 9, 1955, which is a continuation of my application Serial No. 301,981, filed July 31, 1952, now abandoned, a process for preparing alumina and alumina-silica hydrous gels in the form of glass-like microspheres has been described. In this process, alumina in hydrous form is precipitated by adding to an aqueous alkaline aluminate solution a quantity of an inorganic acidic compound having an anion which forms salts with aluminum that are soluble in said alkaline aqueous solution, effecting said precipitation at a temperature within the range of 40° F. to 180° F. with the concentration of alumina within the range of about 0.88% to 6% by weight, calculated as $Al_2O_3$, maintaining the pH during said precipitation within the range of 8 to about 12, and controlling the temperature, concentration of $Al_2O_3$ and pH within the aforesaid ranges to produce a slurry of alumina which when filtered and dried contains the alumina in a continuous phase glass-like form. The solids concentration of this slurry is then preferably adjusted to be in excess of 3.5% $Al_2O_3$ after which the resultant product is dried. Alumina-silica gels are prepared in a similar manner except that an alkali soluble silicate or some other silica-forming material is added contemporaneously with the alkali soluble aluminate so that both alumina and silica in gel form are precipitated. The alumina or the alumina-silica hydrous gels in solid form can have incorporated therewith metals or metal compounds to produce catalysts for various purposes in any suitable manner, for example, as herein described.

While the foregoing process makes it possible to produce alumina and alumina-silica hydrous gels in solid form having desirable characteristics of surface area and pore volume, the temperature, concentrations of reactants and pH must be rather carefully controlled because otherwise a chalky precipitate is formed which does not have the desired surface area and pore volume to make it suitable for use as a catalyst. One difficulty which is encountered in this process is that the conditions required to produce the glass-like alumina or alumina-silica hydrous gels ordinarily make it necessary to operate at a high pH which interferes with such mechanical operations as filtration. Highly alkaline solutions are very difficult to handle, especially when hot and destroy or impair filter cloths. They also make it necessary to use special types of equipment. However, by carrying out the precipitation of the alumina or alumina-silica gels in the presence of an aldonic acid or aldonate, it is possible to effect the precipitation and produce alumina or alumina-silica particles in hydrous gel form at a lower pH than is possible without the addition of the aldonic acid or aldonate. Furthermore, it is possible to carry out the process at elevated temperatures which would not be practical with higher pH's. Thus, in the practice of this invention it is possible to effect the precipitation of the alumina or alumina-silica in hydrous gel form at temperatures in excess of about 95° F., preferably around 110° F. to 140° F., and a final pH within the range of 9 to 10.5, whereas under corresponding conditions without the addition of the aldonic acid or aldonate a chalky precipitate is obtained rather than a glassy gel. The use of the higher temperatures has the further advantage that the gels made at the higher temperatures have increased surface area and increased pore volume as compared with products made at lower temperatures.

Although the preferred products are alumina microspheres which may or may not contain additional metal oxides, it will be understood that these products can be prepared in accordance with the invention in forms other than microspheres.

Where the alumina compositions are prepared as microspheres they are preferably spray dried at temperatures within the range of 200° F. to 1000° F. under conditions such that the temperature of the microspheres at the completion of the spray drying process are within the range of 150° F. to 300° F. In preparing the alumina I have found that the pH during the preparation will markedly affect the physical characteristic of the resultant product. If the pH is in the range of about 9 to 10.5 the microspheres are clear. If the pH is below about 9 the microspheres are opaque. If the pH is within the range of 4 to 7 a powdery product is obtained.

The particle size is affected by the concentration of the $Al_2O_3$. The slurry to be spray dried preferably has a concentration of $Al_2O_3$ within the range of 4 to 7% by weight. At this concentration it is possible to obtain particles having a size of 20 to 100 microns. If the concentration of $Al_2O_3$ in the slurry is below 3.5% by weight substantial quantities of large particles are not formed. However, the use of concentrations below 3.5% $Al_2O_3$ is desirable if a fine particle size is wanted.

The products of the invention are especially useful as a catalyst base but may also be used for many other purposes where alumina has heretofore been employed. Due to the fact that these products have a higher density than can be obtained with ordinary alumina, the activity rating of a given catalyst in a given volume can be greatly improved by extending the catalyst on an alumina base of the type herein described. Instead of an alumina base the catalyst base can be an alumina-silica base of the type herein described. The use of small amounts of silica to stabilize an alumina base in known in the catalyst art and the present invention contemplates the preparation of catalysts consisting essentially of an activated alumina gel containing about 1% to about 15% of silica. As illustrated in the examples, the silica can be precipitated simultaneously with the alumina.

The alumina herein described, or combinations of alumina and silica, can be employed in association with magnesia as a cracking catalyst. The alumina or alumina-silica base can also be used as a carrier for well know catalytic agents employed in catalytic cracking, dehydrogenation, hydrogenation, hydroforming, desulfurization, aromatization and reforming hydrocarbons. Among the catalytic agents which may be carried on alumina or alumina-silica catalyst bases prepared as herein described are the oxides and other compounds of the related metals which have their differentiating electron in the second from the outermost shell (see W. F. Luder, Jour. of Chem. Ed. 16:394 (1939) for a description of the related metals). These metals are vanadium, manganese, zinc, scandium, iron, cobalt, chromium, copper, titanium, nickel, columbium, masurium, yttrium, rhodium, palladium, molybdenum, hafnium, ruthenium, zirconium, iridium, silver, lanthanum, platinum, thorium, mercury, uranium, gold, tungsten, cadmium, rhenium, tantalum, osmium, and actinium. The incorporation of these metals with the alumina base or the alumina-silica base of the type herein described can be effected by a suitable treatment of the base with the sulfates, chlorides, nitrates, molybdenates, vanadates, chromates and other suitable salts by impregnation, precipitation, co-precipitation with the alumina or according to methods well known in the art. The alumina or alumina-silica bases can also have incorporated therewith zirconia, titania and/or thoria.

The alumina or alumina-silica bases herein described are particularly suitable for use as carriers for the oxides or molecullar combinations of chromium, molybdenum, cobalt and vanadium. As an illustration, a carrier consisting essentially of an alumina and silica gel of the type herein described can be used to support 1% to 12% of molybdenum oxide, the silica in the carrier constituting about 1% to 15% of the catalyst composition. Similar catalysts can be prepared containing as addiitonal ingredients up to 10% of titania and/or iron oxide.

The catalysts prepared as herein described can be used in fixed bed type of catalytic processes and also are very advantageously employed in the so-called fluidized processes where the catalyst is maintained in suspension in the reactant vapors during the reaction. The employment of catalysts carried on a very dense alumina or alumina-silica base as herein described is extremely important in the operation of fluid hydroforming units since the denser the catalyst the smaller the unit can be for a given throughput of oil.

The expression "alumina in hydrous form" is intended to cover the various states in which $Al_2O_3$ exists when combined with water. The conditions of the precipitation will determine the extent to which a gel is formed from the aluminum compound.

The disclosure of my copending application Serial No. 546,007, filed November 9, 1955, which is a continuation of my copending application Serial No. 301,981, filed July 31, 1952, now abandoned, is hereby incorporated by reference as fully as if it had been set forth in its entirety for the purpose of illustrating various ways in which alumina or alumina-silica hydrous gels in solid glass-like form can be prepared from alkali metal aluminates.

The invention is hereby claimed as follows:

1. In a process for preparing alumina wherein alumina in hydrous form is precipitated from an aqueous solution of an aluminum compound, the step which comprises effecting said precipitation in the presence of a compound from the group consisting of aldonic acids and aldonates, and drying the resultant product, the quantity of said compound from the group consisting of aldonic acids and aldonates being sufficient to increase the density of the resultant dried product as compared with the density of the same product where no such compound has been used in its preparation.

2. In a process for preparing alumina wherein alumina in hydrous form is precipitated from an alkaline aqueous solution of an alkali metal aluminate, the step which comprises effecting said precipitation in the presence of an aldonate dissolved in said solution, and drying the resultant product, the quantity of said aldonate being sufficient to increase the density of the resultant dried product as compared with the density of the same product where no aldonate has been used in its preparation.

3. In a process for preparing alumina wherein alumina in hydrous form is precipitated from an alkaline aqueous solution of an alkali metal aluminate, the step which comprises effecting said precipitation in the presence of a gluconate dissolved in said solution, and drying the resultant product, the quantity of said gluconate being sufficient to increase the density of the resultant dried product as compared with the density of the same product where no gluconate has been used in its preparation.

4. In a process for preparing alumina wherein alumina in hydrous form is precipitated from an alkaline aqueous solution of an alkali metal aluminate, the step which comprises effecting said precipitation in the presence of a gluconate dissolved in said solution, and drying the resultant product, the quantity of said gluconate calculated as gluconic acid being within the range of about 2% to 3% by weight of the $Al_2O_3$.

5. In a process for preparing alumina wherein alumina in hydrous form is precipitated from an alkaline aqueous solution of an alkali metal aluminate at a pH of 9 to 10.5, the step which comprises effecting said precipitation in the presence of sodium gluconate, and drying the resultant product, the quantity of said gluconate calculated as gluconic acid being within the range of about 2% to about 3% by weight of the $Al_2O_3$.

6. In a process for preparing alumina-silica wherein alumina and silica are precipitated together in hydrous form from an aqueous solution of an alkali metal aluminate and an alkali metal silicate, the step which comprises effecting said precipitation in the presence of a compound from the group consisting of aldonic acids and aldonates, and drying the resultant product, the quantity of said compound from the group consisting of aldonic acids and aldonates being sufficient to increase the density of the resultant dried product as compared with the density of the same product where no such compound has been used in its preparation.

7. In a process for preparing alumina-silica wherein alumina and silica in hydrous form are co-precipitated from an alkaline aqueous solution of an alkali metal aluminate and an alkali metal silicate, the step which comprises effecting said precipitation in the presence of a gluconate dissolved in said solution, and drying the resultant product, the quantity of said gluconate being sufficient to increase the density of the resultant dried product as compared with the density of the same product where no gluconate has been used in its preparation.

8. A process for preparing a dense alumina which comprises adding a quantity of gluconic acid to an alkaline aqueous solution of sodium aluminate, adding a solution of aluminum sulfate to the resultant solution under controlled conditions sufficient to maintain a pH of 9 to 10.5, and separating and drying the resultant precipitate, the quantity of gluconic acid being at least sufficient to increase the density of the resultant dried product as compared with the density of the same product where no gluconic acid has been used in its preparation.

9. A process for preparing a dense alumina-silica which comprises co-precipitating alumina and silica in hydrous form from an alkaline aqueous solution of an alkali metal aluminate and an alkali metal silicate by adding an aqueous solution of aluminum sulfate sufficient to produce a pH of 9 to 10.5 in the presence of sodium gluconate, and drying the resultant product, the quantity of said gluconate calculated as gluconic acid being within the range of about 2% to 3% by weight of the $Al_2O_3$.

10. A process for preparing a dense alumina-silica which comprises adding an aqueous solution of aluminum sulfate to an alkaline aqueous solution of sodium aluminate and sodium silicate containing a quantity of sodium gluconate until the pH is within the range of 9 to 10.5, and separating and drying the resultant product, the quantity of said gluconate being sufficient to produce a more dense alumina-silica composition than is obtained without said gluconate.

11. A process for preparing a dense alumina-silicate in hydrous form which comprises adding an amount of an aqueous solution of aluminum sulfate to an alkaline aqueous solution of sodium aluminate and sodium silicate containing sodium gluconate sufficient to bring the pH within the range of 9 to 10.5, the quantity of said gluconate calculated as gluconic acid being within the range of about 2% to 3% by weight of the $Al_2O_3$, and separating and drying the resultant precipitate.

12. A process for preparing a dense alumina which comprises precipitating alumina in hydrous form by adding to an aqueous alkaline sodium aluminate solution a quantity of an aqueous aluminum sulfate solution at a temperature within the range of 40° F. to 140° F. in the presence of sodium gluconate, the concentration of the alumina in the resultant slurry being below 3.5% by weight, calculated as $Al_2O_3$, the concentration of sodium gluconate, calculated as gluconic acid on the weight of $Al_2O_3$, being within the range of .5% to 6.0%, and the amount of aluminum sulfate being sufficient to bring the pH within the range of 9 to 10.5 and sufficiently high within said range to produce a slurry of alumina which when filtered and dried contains the alumina in a continuous phase glass-like hydrous form.

13. A process for preparing alumina-silica in hydrous form which comprises adding to a dilute aqueous solution of sodium aluminate and sodium silicate a quantity of a dilute aqueous solution of aluminum sulfate at a temperature of 40° F. to 140° F. in the presence of sodium gluconate, the concentration of alumina in the resultant slurry being below 3.5% by weight, calculated as $Al_2O_3$, the concentration of silica being about 1% to about 15% by weight of the alumina, the concentration of sodium gluconate, calculated as gluconic acid on the weight of $Al_2O_3$, being within the range of 0.5% to 6%, and the amount of aluminum sulfate being sufficient to bring the pH within the range of 9 to 10.5 and sufficiently high within said range to produce a slurry of alumina-silica which when filtered and dried contains the alumina-silica in a continuous phase glass-like hydrous form.

14. A process of preparing a dense alumina which comprises mixing in an aqueous medium sodium aluminate, aluminum sulfate and gluconic acid, adjusting the pH of the aqueous medium to a value within the limits of from about 9–10 and filtering and drying the resultant precipitate, the quantity of gluconic acid being at least sufficient to increase the density of the resultant dried product as compared with the density of the same product where no gluconic acid has been used in its preparation.

15. A process of preparing a dense alumina-silica which comprises mixing in an aqueous medium sodium aluminate, aluminum sulfate, sodium silicate and gluconic acid, adjusting the pH of the aqueous medium to a value within the limits of from about 9–10 and filtering and drying the resultant precipitate, the quantity of gluconic acid being at least sufficient to increase the density of the resultant dried product as compared with the density of the same product where no gluconic acid has been used in its preparation.

16. An alumina in solid hydrous form obtained by precipitating alumina in hydrous form from an aqueous solution of an alkali metal aluminate in the presence of a compound from the group consisting of aldonic acids and aldonates, and drying the resultant product, the quantity of said compound from the group consisting of aldonic acids and aldonates being sufficient to increase the density of the resultant dried product as compared with the density of the same product where no such compound has been used in its preparation.

17. A catalyst consisting essentially of a catalyst base consisting essentially of a compound from the group consisting of alumina in hydrous gel form and both alumina and silica in hydrous gel form but not more than 15% by weight of silica based on the total weight of alumina and silica, and a compound from the group consisting of oxides and inorganic salts of a catalytically active metal incorporated with said catalyst base, said metal being a metal from the group consisting of one of the related metals having its differentiating electron in the second from the outermost shell, the proportion of said metal to said catalyst base being a minor proportion, said catalyst base being characterized by the fact that the alumina therein is precipitated in hydrous gel form from an aqueous solution of an alkali metal aluminate containing a compound from the group consisting of aldonic acids and aldonates in an amount sufficient to increase the density of the alumina after drying as compared with the density of the same product where no compound from the group consisting of aldonic acids and aldonates has been used in its preparation.

18. A catalyst as claimed in claim 17 in which the catalyst base consists essentially of alumina and silica in hydrous gel form, the quantity of silica being within the range of 1% to 15% by weight of the catalyst base and the catalytically active metal component is molybdenum in the form of molybdenum oxide, the quantity of molybdenum oxide being within the range of 1% to 12% by weight of the catalyst.

19. A process for preparing alumina which comprises precipitating alumina in hydrous form by adding to an aqueous alkaline sodium aluminate solution a quantity of an aqueous aluminum sulfate solution at a temperature within the range of 110° F. to 140° F. in the presence of sodium gluconate, the concentration of alumina in the resultant slurry being below 3.5% by weight, calculated as $Al_2O_3$, the concentration of sodium gluconate, calculated as gluconic acid on the weight of $Al_2O_3$, being within the range of .5% to 6.0%, and the amount of aluminum sulfate being sufficient to bring the pH within the range of 9 to 10.5 and sufficiently high within said range to produce a slurry of alumina which when filtered and dried contains the alumina in a continuous phase glass-like hydrous form.

20. A process as claimed in claim 19 in which an aqueous sodium silicate solution is mixed with the alkaline sodium aluminate solution in quantities such that the quantity of silica in the resultant dried alumina-silica composition is within the range of 1% to 15% by weight of said composition.

21. An alumina in solid hydrous form obtained by precipitating alumina in hydrous form from an aqueous solution of an alkali metal aluminate in the presence of sodium gluconate, and drying the resultant product, the quantity of said gluconate being sufficient to increase the density of the resultant dried product as compared with the density of the same product where said gluconate has not been used in its preparation.

22. A catalyst as claimed in claim 17 in which said compound from the group consisting of aldonic acids and aldonates is sodium gluconate.

23. A catalyst consisting essentially of a catalyst base consisting essentially of alumina and silica in hydrous gel form, the quantity of silica being within the range of 1% to 15% by weight of the total alumina and silica on a dry basis, and molybdenum oxide incorporated with said catalyst base in an amount within the range of 1% to 12% by weight of the dried catalyst, said catalyst base being characterized by the fact that the alumina and silica therein are precipitated in hydrous gel form from an aqueous solution containing sodium aluminate, sodium silicate and sodium gluconate, the amount of sodium gluconate being within the range of 0.5% to 6%, calculated as gluconic acid, on the weight of $Al_2O_3$ in said catalyst.

References Cited in the file of this patent

UNITED STATES PATENTS

| | | |
|---|---|---|
| 1,157,436 | Spence et al. | Oct. 19, 1915 |
| 2,028,575 | Torigian | Jan. 21, 1936 |
| 2,386,810 | Marisic et al. | Oct. 16, 1945 |
| 2,398,610 | Bailey et al. | Apr. 16, 1946 |
| 2,446,799 | Winding | Aug. 10, 1948 |
| 2,487,564 | Layng | Nov. 8, 1949 |
| 2,548,860 | Bond | Apr. 17, 1951 |
| 2,597,384 | Sanders | May 30, 1952 |